United States Patent [19]

Yoshino et al.

[11] Patent Number: 4,471,437
[45] Date of Patent: Sep. 11, 1984

[54] OVERDRIVE CONTROL APPARATUS

[75] Inventors: Yasuhisa Yoshino, Okazaki; Akira Kuno, Oobu; Hidetoshi Shimizu; Harumasa Minegishi, both of Susono, all of Japan

[73] Assignees: Nippon Soken, Inc., Nishio; Toyota Jidosha Kogyo Kabushiki Kaisha, Toyota, both of Japan

[21] Appl. No.: 249,876

[22] Filed: Apr. 1, 1981

[30] Foreign Application Priority Data

Apr. 4, 1980 [JP] Japan ............................. 55-44969
Apr. 25, 1980 [JP] Japan ............................. 55-55867
Apr. 28, 1980 [JP] Japan ............................. 55-56919

[51] Int. Cl.³ .................... B60K 41/08; B60K 41/22; G06F 15/20
[52] U.S. Cl. .................. 364/424.1; 74/866; 192/3.58
[58] Field of Search .............. 192/0.03, 0.033, 0.073, 192/0.076, 3.58; 74/866, 740, 867, 752 D; 364/424.1; 73/178 R

[56] References Cited

U.S. PATENT DOCUMENTS

| 3,702,572 | 11/1972 | Wakamatsu et al. | 74/866 |
| 3,724,293 | 4/1973 | Wakamatsu et al. | 74/866 |
| 3,881,368 | 5/1975 | Furuhashi et al. | 74/866 |
| 3,885,472 | 5/1975 | Wakamatsu et al. | 74/866 |
| 3,903,759 | 9/1975 | Hashimoto | 74/866 |
| 4,266,447 | 5/1981 | Heess et al. | 74/866 X |
| 4,274,306 | 6/1981 | Yokoi et al. | 74/866 |
| 4,282,780 | 8/1981 | Totani et al. | 74/866 |
| 4,282,957 | 8/1981 | Sugimoto et al. | 74/740 |
| 4,314,340 | 2/1982 | Miki et al. | 364/424.1 |
| 4,335,428 | 6/1982 | Miki et al. | 364/424.1 |
| 4,346,626 | 8/1982 | Kawamoto | 74/866 |
| 4,356,726 | 11/1982 | Yoshino | 73/178 R |

Primary Examiner—Felix D. Gruber
Attorney, Agent, or Firm—Cushman, Darby & Cushman

[57] ABSTRACT

An overdrive control apparatus is provided with a gradient sensor unit for sensing a gradient of a vehicle running road. The overdrive control apparatus releases an overdrive mode of an automatic change gear device which is set up for a level drive of the vehicle in accordance with a sensing signal from the gradient sensing unit.

7 Claims, 17 Drawing Figures

FIG. 17

OVERDRIVE CONTROL APPARATUS

BACKGROUND OF THE INVENTION

The present invention relates to an overdrive control apparatus for controlling an automatic gear change of an overdrive in accordance with a running speed and an engine load of a vehicle such as an automobile.

In a conventional automatic gear change control apparatus with a three-speed gear overdrive for an ordinary car in an automatic gear change control apparatus used in an automobile, comprising first (low), second, third and overdrive gears, the gear commanded is coupled with a gear on the engine side by means of a pneumatic coupling called a pneumatic torque converter in accordance with gear change points (line) which are preset according to a sensed running speed (vehicle speed) and a sensed engine load. Only for use with the overdrive range, a manual switch is installed on an instrument panel. So long as the overdrive switch is ON, the overdrive gear is effective in operation. On the other hand, when it is OFF, the overdrive gear is ineffective, while the first to third gears are effective. In gearing up from the low to second gear range, the second to third gear range or the third to overdrive gear range, or in gearing down from the second to first gear range, the third to second gear range or the overdrive to third gear range, a fixed zone, i.e. a hysteresis characteristic, is set up in the vehicle speed at the gear-up point and at the gear-down point, in order to prevent hunting.

The automatic gear change apparatus has no problem in particular in a level road drive because it has a change gear point to provide the best fuel consumption in the level road drive. On an ascending road with a larger gradient than a given value, the fuel consumption, drivability and acceleration are all better in the third gear range than in the overdrive range. Nevertheless, since that gear change point is set so as to improve the fuel consumption in the level road drive, no gear down shift from the overdrive to the third gear range takes place when the vehicle comes to an ascending road with such a gradient. Therefore, the vehicle runs in an ineffective drive condition, that is, with large fuel consumption, poor drivability and poor acceleration. Further in the overdrive range, the engine braking is only partially effective on the descending road. Therefore, the automatic gear change control device of the prior art is disadvantageous from the view point of safety in driving. Therefore, the manual overdrive switch must be operated every time the car comes to the ascending or descending road. The manual switching operation is troublesome for the driver. The troublesome manipulation taxes the limited mechanical ability of the drivers and therefore is undesirable from a viewpoint of the driving safety.

OBJECTS AND SUMMARY OF THE INVENTION

Accordingly, an object of the present invention is to provide an overdrive control apparatus which has improved drivability on a climbing road, elimination of any manual operation for the overdrive and securing driving safety.

To achieve the above object, an overdrive control apparatus according to the present invention is provided with a gradient sensor for sensing a gradient of the driven road. In response to the signal from the gradient sensor, the apparatus checks whether a climbing road or descending road has a gradient which exceeds predetermined limits and if it does releases the overdrive gear coupling.

BRIEF DESCRIPTION OF THE DRAWINGS

Other objects, features and advantages of this invention will be apparent from the detailed description taken in conjunction with the accompanying drawings, in which.

DETAILED DESCRIPTION OF THE PREFERRED EMBODIMENTS

Figure 1:
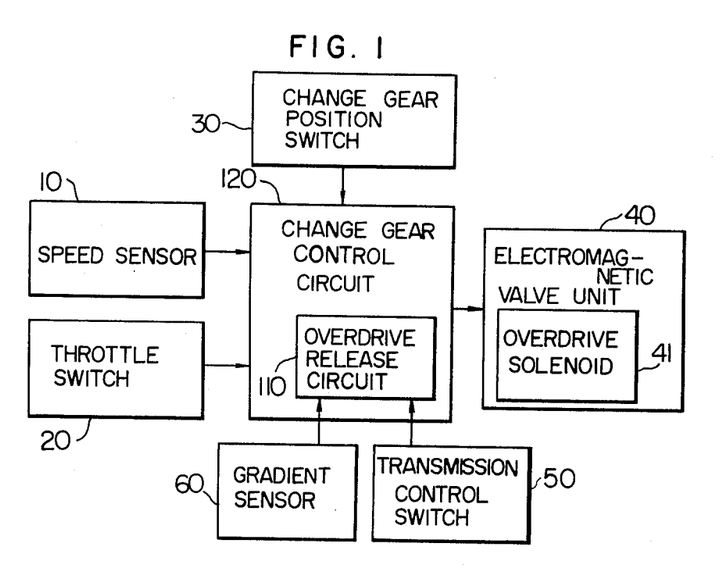
FIG. 1 is a block diagram of an overall construction of the present invention.

The present invention will be described referring to the accompanying drawings. In FIG. 1 illustrating an overall construction of an overdrive control apparatus according to the present invention, reference numeral 10 designates a speed sensor for sensing a running speed (vehicle speed) of an automobile; 20 a throttle switch for detecting an opening of a throttle in a plurality of steps, and 30 a gear position switch operated by a manual shift lever. The gear position switch has six positions; a parking (P), a reverse (R), a neutral (N), a drive (D) a second (2), and first (L) ranges. Numeral 40 designates an electromagnetic valve unit for gear change which is provided with solenoids for changing gears of three stages and a solenoid for overdrive for controlling the gear change to the overdrive. A transmission control switch 50 is provided on an instrument panel.

A gradient sensor 60 senses a gradient of a road on which the automobile is running. A gear change control circuit 120 receives various kinds of signals to produce a drive signal for driving the electromagnetic valve unit 40 at a predetermined gear change point, thereby to automatically control the gear change. The gear change control circuit 120 contains an overdrive release circuit 110, in addition to the gear change device.

Suitable arrangements are known in the prior art for a speed sensor 10, throttle switch 20, gear change position switch 30, electromagnetic valve unit 40, and transmission control switch 50 of the overdrive control apparatus. Accordingly, the detailed description herein primarily relates to the overdrive release circuit 110.

Figure 2:
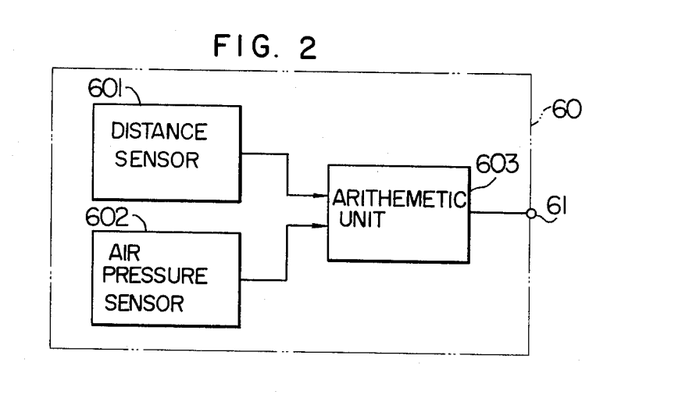
FIG. 2 is a block diagram of an embodiment of a gradient sensor unit used in the circuit shown in FIG. 1.

The gradient sensor 60 will be described with reference to FIG. 2. 601 designates a distance sensor for detecting a running distance of the vehicle, which produces a signal as a train of pulses each pulse representing approximately 0.4 m travel. Numeral 603 receives a running distance signal from the distance sensor 601 and an air pressure signal from an air pressure sensor 602 to measure an air pressure difference of ΔP mbar for each unit running distance (about 25 m). The air pressure reduces by about 0.12 mbar every 1 m of altitude rise. Therefore, an amount of gradient is expressed by a percentage of the result of dividing an amount of altitude change (ΔP/0.12) by the unit running distance (25 m), ΔP/(0.12×25)×100%. When the gradient amount calculated is above +8% or below −4%, the gradient sensor 60 produces at the output terminal 61 a gradient sensing signal of voltage (V).

Figure 3:
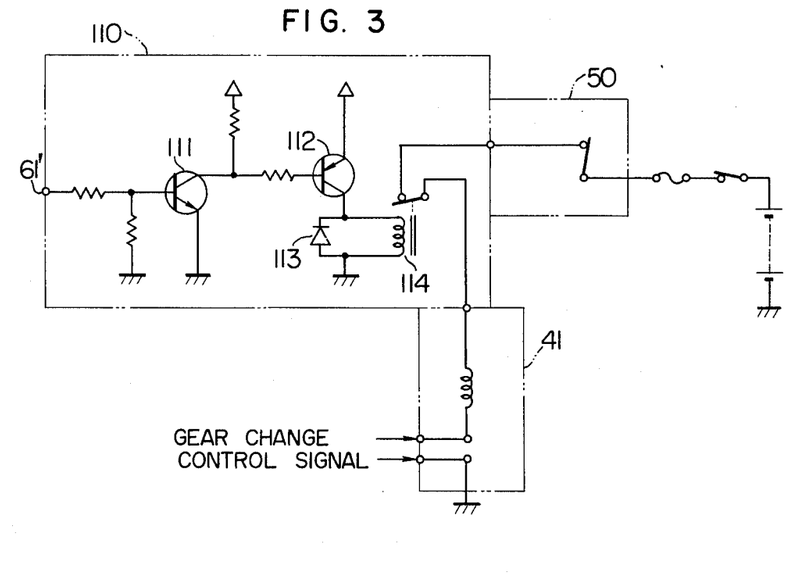
FIG. 3 is a circuit diagram of a detailed circuit construction of a portion of the circuit shown in FIG. 1.

Turning to FIG. 3, there is shown a circuit diagram including the overdrive release circuit 110, the transmission control switch 50, and the overdrive solenoid 41. The overdrive release circuit 110 is comprised of a PNP transistor 111, an NPN transistor 112, a surge voltage absorption diode 113, a normally closed relay 114, and some resistors. When the output volate E(V) (the logic "1" level signal) appears at the output of the gradient sensor 60, the NPN transistor 112 and PNP transistor 111 are turned on and thus the normally closed relay 114 is driven to open its relay contact. Assuming that the transmission control switch 50 has been closed and if current is fed from a car battery to the transmission solenoid through the key switch and fuse, the relay contact opens to release the overdrive.

In operation, when a car is running on a flat road in the D range of the gear change position switch 30, the gradient sensor 60 produces no gradient sensing signal, so that depending on a throttle opening sensed by the throttle switch 20 and a car speed sensed by the speed sensor 10, judgement is made of the predetermined gear change point of the gear change control circuit 120 and a drive signal representing a gear change command in accordance with a running state is applied to the electromagnetic valve unit 40 to provide a car running at a proper gear change position.

When a stationary car starts, the gear change normally shifts from the first-second-third to make a stable gear change control according to a load. When the car speed enters a relatively high speed region in a closed state of the transmission control switch 50, the gear change control circuit 120 applies an overdrive control signal to the overdrive solenoid 41 to energize the same. As a result, the car comes into the overdrive range.

Under this running condition, when the gradient of the road is 8% or more, the gradient sensor 60 produces a gradient sensing signal which in turn inverts an OFF state of the transistors 111 and 112 to an ON state, and the normally closed relay 114 is opened. As the result from the opening of the relay 114, the current passage through the solenoid 41 for the overdrive is shut off and the electromagnetic valve unit becomes in a released state. Accordingly, on this ascending road, the car runs in the gear change range from the first to third gear.

When the car comes to the descending road with a gradient of −4% or less, the gradient sensor 60 produces the gradient sensing signal, as in the case of the ascending road, with the result that the running of the car on the descending road is performed in the gear change mode from the first to third gear.

When the driver manually opens the transmission control switch 50, the current passage to the overdrive solenoid 41 is forcibly shut off to forcibly release the overdrive range.

In a running condition that the gradient sensor 60 produces no gradient sensing signal, for example, in the case of the level road drive, the improvement of the fuel consumption and the noise reduction are attainable by taking advantge of the overdrive running. In the ascending or descending road providing the generation of the gradient sensing signal from the slope sensing device 60, the overdrive is automatically released to eliminate the need for any special manipulation by the driver. Therefore, the improvement of the drivability and the ensuring of safe driving on the ascending and descending drive are attained.

Figure 4:
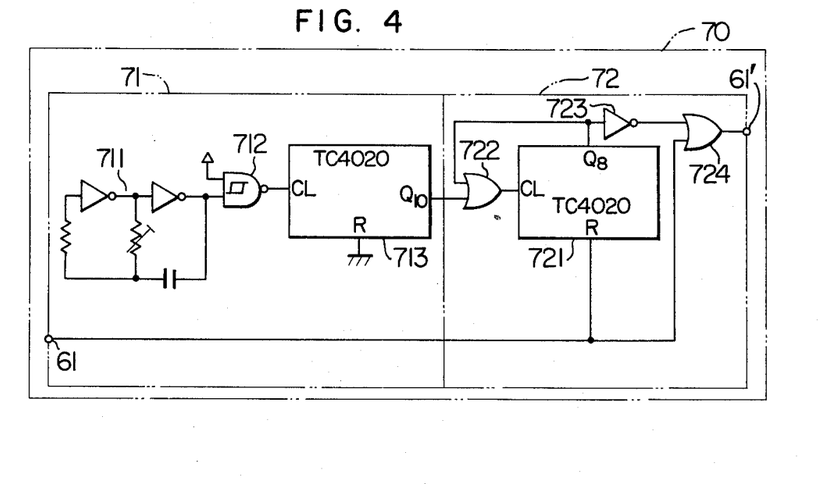
FIG. 4 is a circuit diagram of another portion of the circuit according to the present invention.

A circuit shown in FIG. 4 is designed for preventing degradation of the drive feeling in a mountainous region with many ascending and descending roads where the overdrive is frequently turned ON and OFF. The circuit shown in FIG. 4 has a feature of an additional use of a time limit circuit which prevents the gear range from reshifting to the overdrive gear range in such a situation that after the overdrive is once released, the gradient exceeds +8% or −4% for a fixed time interval, for example, 10 seconds. The circuit construction of the time limit circuit is shown in FIG. 4. The time limit circuit 70 is inserted between the gradient sensing unit 60 and the overdrive release circuit 110 shown in FIG. 3 used in the overall construction shown in FIG. 1. In the figure, reference numeral 71 designates a clock signal generating circuit which is comprised of a CR oscillator 711 oscillating at a fixed frequency, a NAND gate 712 with a hysteresis characteristic for waveshaping, and a frequency dividing binary counter, for example, a known integrated circuit TC4020 by Toshiba in Japan. Receiving 13.1 KHz generated by the CR oscillator 711, the binary counter 713 produces 12.8 KHz clock pulses at the 10th state "$Q_{10}$". A counter circuit 72 is comprised of a binary counter 721, for example, TC4020, an OR gate 722, an inverter 723 and an OR gate 724. When the gradient sensing signal of E(V) ("1" binary level signal) appears at the output terminal 61 of the gradient detector 60, the binary counter 721 is reset and the 8th stage "$Q_8$" is in "0" level. Accordingly, the output of the inverter 723 has "1" level and the output of the OR gate 724 is a "1" level. When the gradient sensing signal of E(V) is a "0" level, the binary counter 721 is reset to start the count operation through the OR gate 722. At this time, the signal of about 12.8 Hz is inputted from the OR gate 722 to the binary counter 721. Accordingly, the 8th stage of binary counter 721 becomes a "1" level after $1/12.8 \times 2^8 \times \frac{1}{2} \approx 10$ seconds. Accordingly, the output of the inverter 723 is in "0" level and the output of the OR gate 724 is also in "0" level. In other words, the output, i.e. the output terminal 61' of the OR gate still remains "1" level for about 10 seconds after E(V) is in "0" level.

When the provision of the time limit circuit between the output terminal 61 of the gradient sensor 60 and the input terminal 61' of the overdrive release circuit 110, the overdrive mode continues for 10 seconds after the gradient of the road is above +8% or −4%. Therefore, it is possible to prevent the deterioration of the drive feeling.

The running data may be visualized by displaying the signal from the slope sensor 60 by means of a display unit constructed by the light emission diode, the liquid crystal or the lamps.

While the above-mentioned embodiment controls the automatic transmission control system and the overdrive control system by the electric circuit including the gear change control circuit 120, the ON and OFF control of the solenoid to release the overdrive in an automatic transmission device of the mechanical control type, which as disclosed in a journal "Automobile Technology" Vol. 32, No. 7, 1978, pp 710 to 714 and was marketed on June in 1977 may alternatively be performed by the combination of the slope sensor 60, the transmission control switch 50 and the overdrive release circuit 110.

The slope sensor 60, which was specifically designed to sense the slope of the road on the basis of a running distance and a change of air pressure, may be of another type if it can sense a slope of the road.

Figure 5:
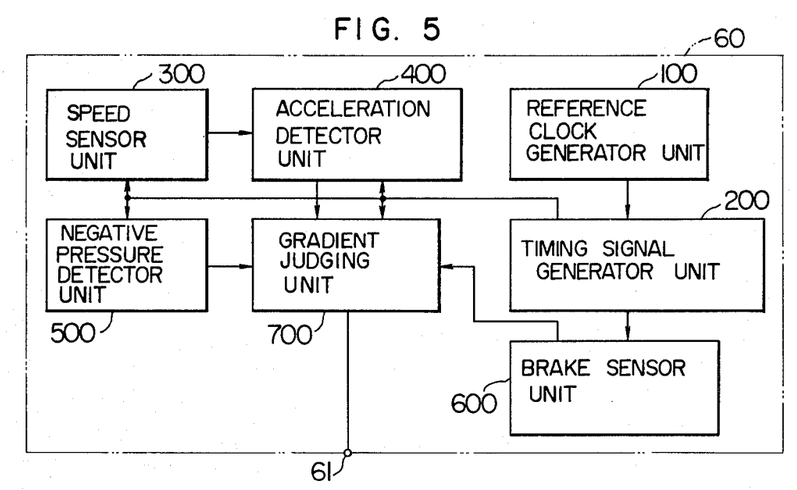
FIG. 5 is a block diagram of another embodiment of a gradient sensor used in the circuit shown in FIG. 1.

Turning now to FIG. 5, there is shown a second embodiment of a gradient sensor 60 according to the present invention. In the figure, reference numeral 100 designates a reference clock generator unit for generating clock pulses of a fixed frequency by using a tuning fork resonator; 200 a timing signal generator unit for operating the respective circuit sections at a proper sequence; 300 a speed sensor unit; 400 an acceleration detector unit for detecting acceleration and deceleration of the vehicle in response to the output signal from the speed sensor circuit; 500 a negative pressure sensor unit containing a semiconductor negative pressure sensor of the diaphragm type for measuring a negative pressure in an intake manifold; 600 a brake sensor unit for sensing an ON state of a brake switch; 700 a gradient judging unit for judging a gradient of the road on the basis of the output signals from the acceleration sensor unit 400 and the negative pressure sensor unit 500.

An explanation of sensing a slope of the road by using the gradient sensor thus constructed follows. Let us consider a situation (A) in the drive on the descending road that the acceleration is carried out even though the throttle valve is closed. On the level road, when the throttle valve is closed, the engine braking normally operates to never provide the above situation (A). On the descending road, however, since potential energy is converted into kinetic energy, the above phenomenon (A) takes place.

When the throttle valve is closed, a negative pressure in the intake manifold is large and therefore the situation (A) may equivalently be considered as: (a) A negative pressure is large although the acceleration is made.

When the thought as just mentioned is applied to the drive on the ascending road, the deceleration is made even though the throttle valve has an opening larger than a predetermined one or (b) the negative pressure is small even in the deceleration mode. The ascending and descending drives may be judged in accordance with the above conditions (a) and (b), respectively. As regards a magnitude of the gradient, for example, according to the condition (a), when the acceleration and the negative pressure are both large, it is judged that the gradient is steep. On the other hand, when neither the acceleration nor the negative pressure are large, the gradient is gentle. According to the condition (b), as the deceleration is larger but the negative pressure is smaller, the gradient is more steep. Conversely, when the deceleration is not large and the negative pressure is not small, the gradient is gentle. An example of the judging conditions obtained by our experiment will be tabulated below.

JUDGING TABLE I

|  | ON condition | | | OFF condition |
|---|---|---|---|---|
|  | Descending road | Ascending road | Descending road brake | Level road |
| Negative Pressure (mmHg) | −380 or Less | −100 or More | −380 or Less | −380 < P < −100 |
| Acceleration/ deceleration (G) | +0.02 or More | −0.02 or Less | +0.02 or More | — |
| Time duration (Sec) | 2.83 × 2(Time) | 2.83 × 2 | 2.83 × 1 | 2.83 × 2 |
| Vehicle speed (km/h) | 30 or More | 30 or More | 30 or More | 50 or More |
| Brake | — | — | ON | — |

The reason why the vehicle condition is contained in the above judging table is that at 50 Km/h, the gear change device is geared up from the third to overdrive gear region and at 30 Km/h more or less, the gear shift is made from the overdrive to third gear region. In this case, the 30 Km/h is selected considering the prevention of an erroneous operation at the start. The 50 Km/h is selected allowing for the frequent ON and OFF operations of the overdrive in a mountainous region.

The further details of the respective portions in FIG. 5 will be described.

Figure 6:
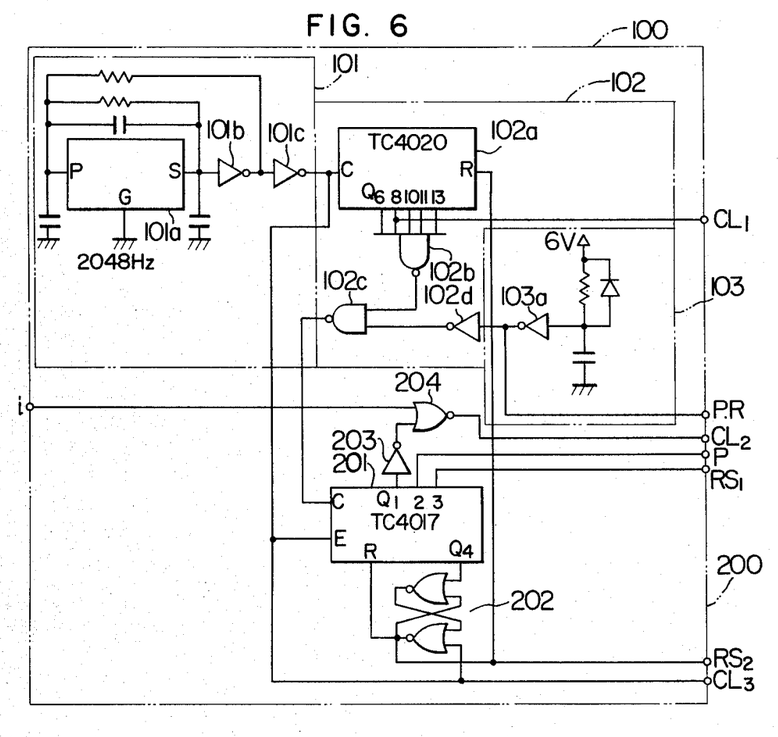
FIG. 6 is a circuit diagram of a reference clock generator unit and a timing signal generator unit used in the circuit shown in FIG. 5.

FIG. 6 illustrates the details of the reference clock unit 100 and the timing signal unit 200. As shown the reference clock generator unit 100 is comprised of a tuning fork oscillator circuit 101, a frequency dividing circuit 102 and power reset circuit 103. The tuning fork oscillator circuit 101 is comprised of a tuning fork resonator 101a, inverters 101b and 101c, and some resistors and capacitors. A clock signal CL3 of 2048 Hz is produced at the output of the oscillator 101. The frequency dividing circuit 102, for example, an integrated circuit TC4020 made by Toshiba, is comprised of a counter 102a, NAND gates 102b and 102c and an inverter 102d. When 5792 pulses of the clock signal CL3 of 2048 Hz, that is, 5729/2048 ÷2.83 sec, is counted, the 6, 8, 10, 11, and 13 stages "Q6", "Q8", "Q10", "Q11" and "Q13" are all in "1", so that the five-input NAND gate 102b has "0" level at the output. Accordingly, the output of the NAND gate 102c is in "1" level. A power reset circuit 103 produces a short pulse of "1" level at the output of the inverter 103a when the power source is turned on and subsequently continues "0" level.

The timing signal generator unit 200, an integrated circuit TC4017 made by Toshiba, is comprised of a scale-of-10 counter 201, an ARs flip-flop 202 containing two OR gates, an inverter 203 and a NOR gate 204. When a "1" level signal from the NAND gate 102c in the reference clock generator circuit 100 is applied to the clock terminal "C" of the counter 201, the counter 201 is ready for its count and counts the clock signal CL3 coming in through the clock-in enable terminal "E" to produce "1" level pulses at the 1st to 4th stages "Q1" to "Q4" is this order. In "1" level of the 4th stage "Q4", the RS flip-flop 202 is triggered to produce a reset signal RS2 to reset both the counters 102a and 201. At this point, a sequence of operation is completed and a similar operation sequence will be repeated after 2.83 sec. When the vehicle speed exceeds a predetermined value (about 130 Km/h), a "1" level signal appears at the terminal i to block the generation of the CL2 signal.

Figure 7:
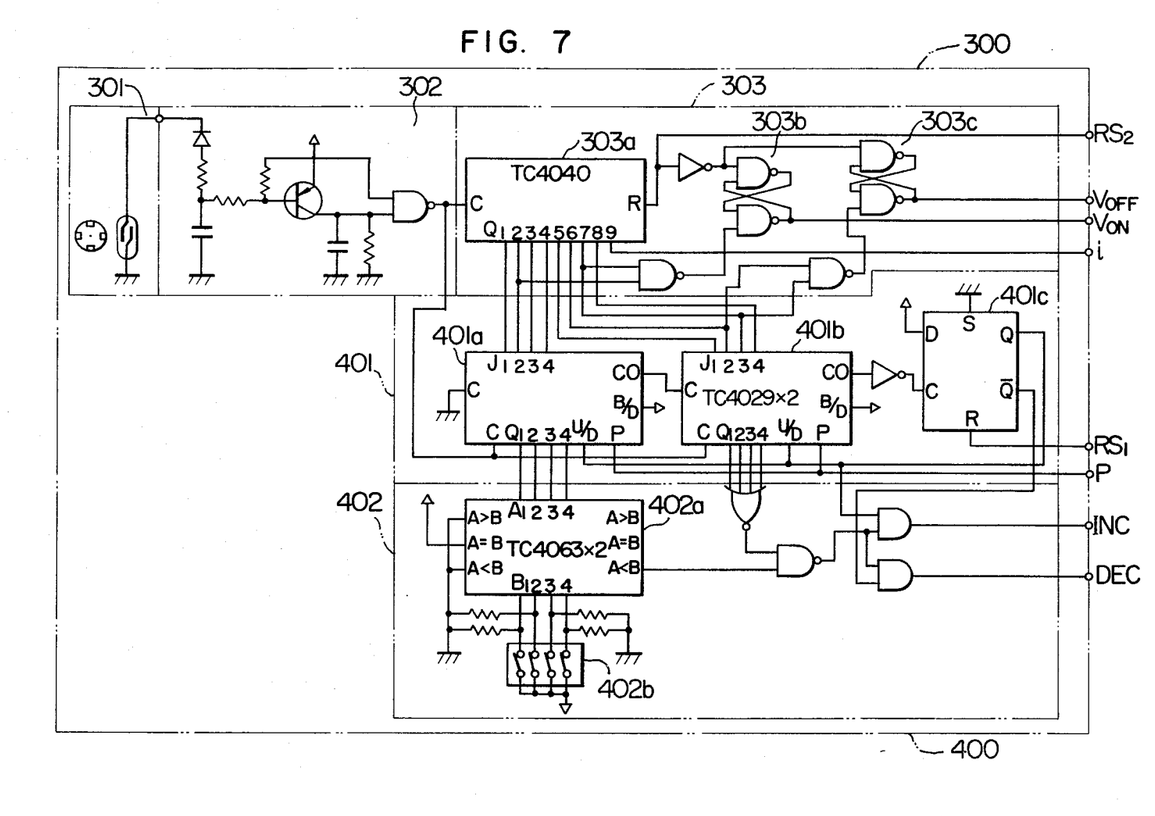
FIG. 7 is a circuit diagram of a vehicle speed sensor and an acceleration sensor used in the circuit shown in FIG. 5.

FIG. 7 shows the details of the speed sensor unit 300 and the acceleration sensor unit 400. The speed sensor unit 300 is comprised of a vehicle sensor 301 for generating four pulses per one rotation of the speed meter cable shaft, a wave-shaping circuit 302 and a vehicle speed sensing circuit 303. The pulses generated by the speed sensor 301 is wave-shaped in the wave-shaping circuit 302 and then is applied to the vehicle speed sensing circuit 303. The speed sensing circuit 303 is comprised of a binary counter 303a, and two RS flip-flops 303b and 303c. The duration of 2.83 sec of the pulse RS2 generated from the timing signal generator unit 200 allows the binary counter 303a to count speed pulses. Through the counting, the speed sensing circuit 3093 produces a "1" signal at the output $V_{ON}$ at about 30 Km/h and a "1" signal at the output $V_{OFF}$ at 50 Km/h or more. When the vehicle speed is above approximately 130 Km/h, a "1" level signal appears at the terminal i. The acceleration sensing unit 400 is comprised of a psuedo differential circuit 401 and an acceleration setting circuit 402. The psuedo differential circuit 401 is comprised of presettable up/down counters 401a and 401b and a D flip-flop 401c. In response to a preset signal P from the timing signal generator unit 200, the contents of the binary counter 303a in the speed sensing circuit 300 are preset in the presettable up/down counters 401a and 401b and the contents preset are counted down by the vehicle pulse during the next vehicle measuring period of 2.83 sec succeeding to that of the vehicle speed just preset. When the vehicle speed just preset is smaller than that measured during the succeeding measuring period 2.83 sec, that is, in an acceleration mode, the speed pulses of the latter vehicle speed are larger than the preset ones. Accordingly, the contents of the presettable up/down counters 401a and 401b are zero. At this time, the flip-flop 401c is triggerred to render the presettable up/down counters 401a and 401b in an up count mode. In this mode, those counters count up by an amount of the vehicle speed difference. If the vehicle speed measured in the next 2.83 sec period is smaller than the present one, the D flip-flop 401c is not triggered and an amount of the vehicle speed difference at this time is left in the counters. Repeating the operations for each 2.83 sec, the speed difference per 2.83 sec, i.e. a psuedo differential value, i.e. an acceleration, appears at the outputs Q1 to Q4 of the presettable up/down counters 401a and 401b and positive and negative accelerations are at the output Q and $\overline{Q}$ of the D flip-flop 401c. The magnitude of the acceleration is $$0.005 \text{ G} \left( \frac{1}{(2.83)^2 \times 9.8 \times 2.548} \approx 0.005 \right)$$

per bit of a minimum bit of the presettable up/down) counter 401a.

Figure 8:
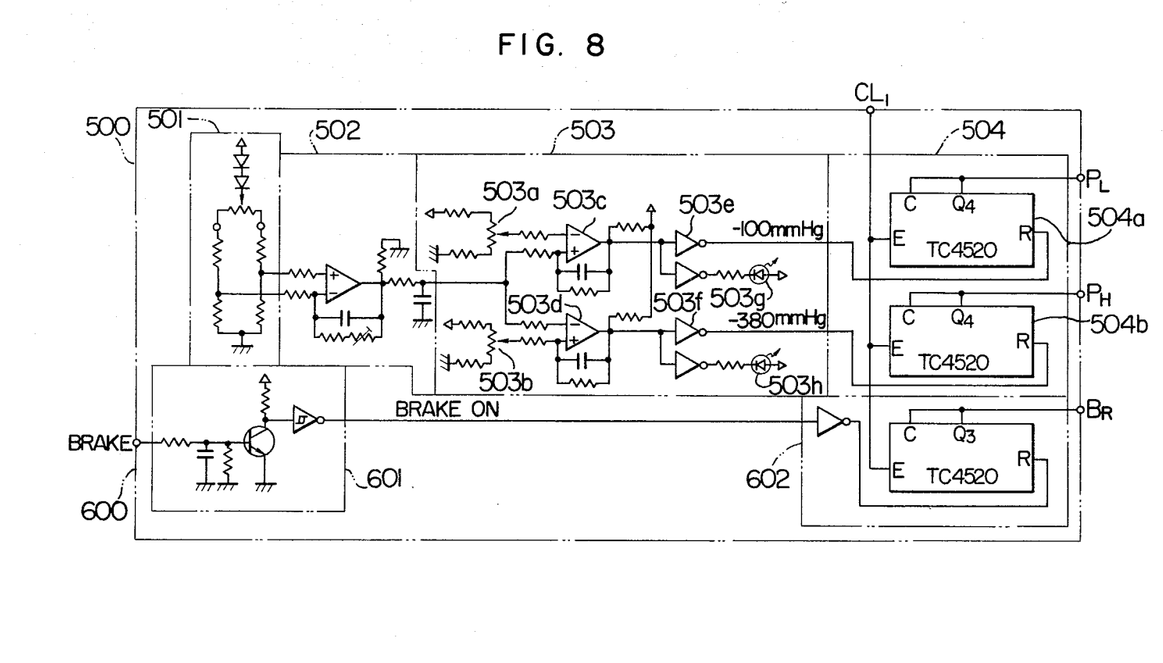
FIG. 8 is a circuit diagram of a negative pressure sensor unit and a brake sensor unit used in the circuit shown in FIG. 5.

FIG. 8 shows the combination of the negative pressure sensor unit 500 and a brake sensor unit 600. The negative pressure sesor unit 500 is comprised of a negative sensor 501, a differential amplifier 502, a comparator circuit 503 and a time limit circuit 504. The semiconductor negative pressure sensor 501 of the diaphragm type produces a voltage proportional to a negative pressure in an intake pipe. The differential amplifier 502 amplifies the output voltage signal to a proper amplitude and applies the amplified one to the comparator 503. Potentiometers 503a and 503b are provided for adjusting the voltage to the ones corresponding to −100 mmHg and −380 mmHg, respectively, as indicated in the Judging Table I. When the output signal from the differential amplifier 502 is larger than the voltage of −100 mmHg, the output signal from the comparator 503c is in "1" level and the output signal from the inverter 503c is in "0" level. When the negative pressure in the intake piper is defined by −100 mmHg $\leq$ P $\leq$ −380 mmHg, the output signals from the comparators 503c and 503d are in "0" level and the outputs from the inverters 503e and 503f are both in "1" level. When it is below −380 mmHg, the output signal from the comparator 503d is in "1" level and the output from the inverter 503f is in "0" level. Light emission diodes 503g and 503h are indicators for adjusting the potentiometers 503a and 503b and are not essential to the present invention. The outputs from the inverters 503e and 503f are applied to the reset terminals of the counters 504a and 504b of the time limit circuit 504, respectively. The time limit circuit 504 produces a "1" level signal at the terminals $P_L$ and $P_M$ when the negative pressure in the intake pipe is between −100 mmHg to −380 mmHg for a given time period (2 sec) or more. The output signals are for securing a stable operation.

The brake sensor unit 600 receives an ON signal from the brake switch and is comprised of a waveshaping circuit 601 and a time limit circuit 602, and produces a "1" signal at the terminal $B_R$ when the brake is turned ON for a predetermined time period (1 sec).

Figure 9:
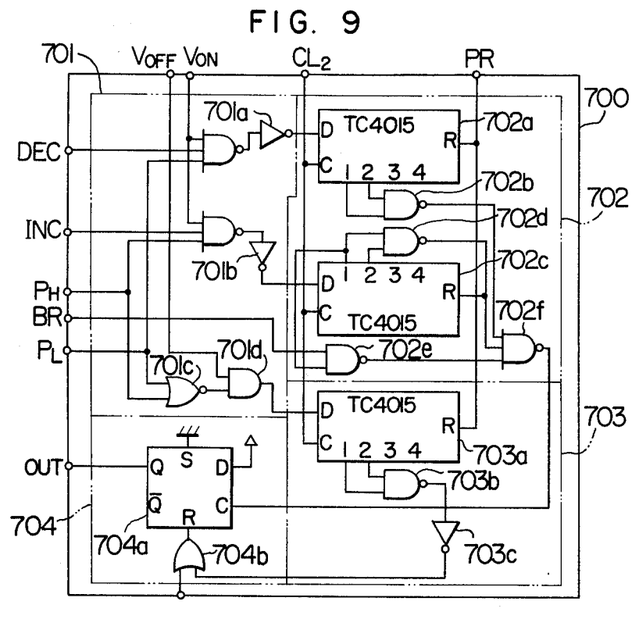
FIG. 9 is a circuit diagram of a gradient judging unit in the circuit shown in FIG. 5.

FIG. 9 is a circuit diagram of the slope judging unit 700 and is comprised of an AND gate 701, an ON circuit 702, an OFF circuit 703 and an output circuit 704. In operation of the AND circuit 701, when the logical product of ($V_{ON} \oplus$ DEC $\oplus P_L$) holds, the output signal from the inverter 701a is a "1" level; when the logical product of ($V_{ON} \oplus$ INC $\oplus P_N$) holds, the output from the inverter 701b is a "1" level; when the logical product of ($V_{OFF} \oplus \overline{P_H} \oplus \overline{P_L}$) holds, the output of the AND gate 701 is a "1" level through a NOR gate 701c. In this case, when the logical product ($V_{ON} \oplus$ DEC $\oplus P_L$) holds, the car drives on the ascending road; when the logical product ($V_{ON} \oplus$ DEC $\oplus P_L$) holds, the car drives on the ascending road; when the logical product ($V_{ON} \oplus$ INC $\oplus P_H$) holds, it runs on the descending road; when the logical product of ($V_{OFF} \oplus P_N \oplus P_L$) holds, it runs on the level road. The ON circuit 702 is comprised of counters 702a and 702c, and NAND gates 702b and 702d, 702e and 702f. When the "1" level signal from the inverter 701a continues for two periods (2.83 sec×2) of the signal CL2, the output signal from the NAND gate 722 is "0" and thus the output from the NAND gate 702f is a "1" level. Similarly, when the "1" level signal from the inverter 701b continues for two periods or more of the CL2 signal, the output from the NAND gate 702f is a "1" level. When the signal $B_R$ is a "1" level at an instant that the "1" level state of the inverter 701b continues for one period or more, the output from the NAND gate 702f becomes a "1" level within the two periods continuation. The OFF circuit 703 is comprised of a counter 703a, a NAND gate 703b, and an inverter 703c. When the "1" level signal from the AND gate 701d continues for two periods or more of the signal CL2, the output of the inverter 703c is a "1" level. The output circuit 704 is comprised of a flip-flop 704a and an OR gate 704b. The "1" level signal from the NAND gate 702f in the ON circuit 702 triggers the D flip-flop 704a of which the output terminal Q becomes a "1" level. The same is reset by the "1" level signal from the inverter 703c in the OFF circuit 703 and the output Q terminal is in "0" level.

As described above, when the ON condition holds in the judging table, the OUT terminal of the output circuit is a "1" level. When the OFF condition holds, it is a "0" level.

Figure 10:
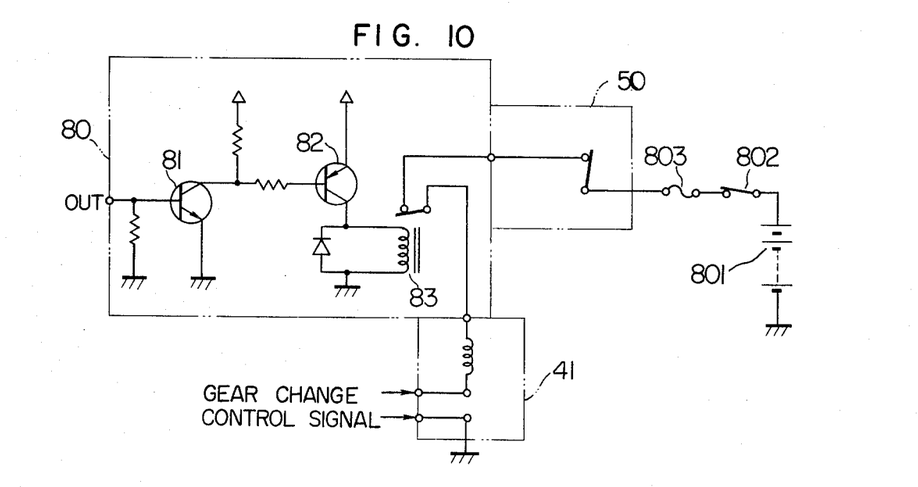
FIG. 10 is a circuit diagram of an overdrive releasing circuit shown in FIG. 1.

FIG. 10 illustrates a circuit diagram of an overdrive release circuit 80. When the car drives in the overdrive mode, current flows through the overdrive solenoid 41, through a car battery 801, an IG switch 802, a fuse 803, and the normally closed relay 83 in the circuit 80. When the vehicle comes to the ascending road and the slope sensor 60 produces a "1" level signal at the OUT terminal, the transistors 81 and 82 in the circuit 89 are turned on, and the normally closed relay 83 is in an open state. As a result, the current flow into the overdrive solenoid 41 is shut off to release the overdrive mode. Then, the car shifts to the normal drive mode on the level road and the OUT terminal of the slope sensor 60 produces a "0" level signal to return the drive mode to the overdrive mode.

With such a construction, even in the overdrive mode, if the slope sensor 60 senses an ascending or descending road with a predetermined gradient or more, the overdrive mode automatically is released and when the car comes to the level road, the drive mode automatically returns to the overdrive mode.

Figure 11:
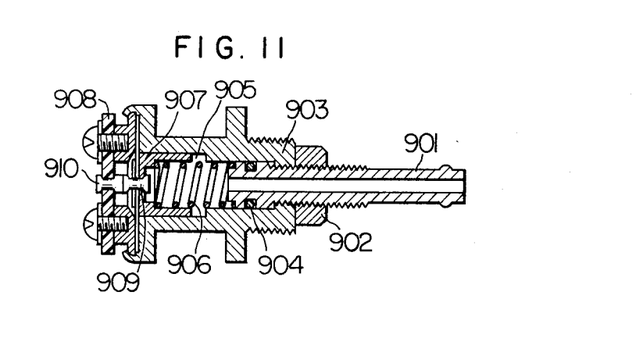
FIG. 11 shows a cross sectional view of a boost pressure switch used in the circuit shown in FIG. 5.
Figure 12:
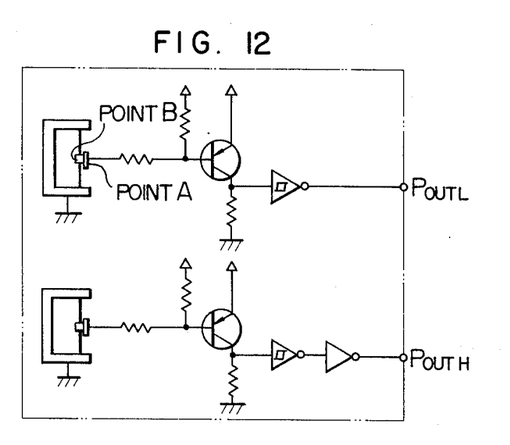
FIG. 12 is a circuit diagram of a negative pressure judging circuit used in the circuit shown in FIG. 5.

Turning to FIGS. 11 and 12, there are shown leading portions of a negative pressure sensor unit well adaptable for digital processing. In a boost pressure switch shown in FIG. 11, reference numeral 901 designates a pipe with an adjust screw to be coupled at the leading end with a rubber pipe for introducing an intake negative pressure. The pipe is provided at the adjust screw part with a nut 902. The other end of the pipe 901 is fixed to the housing 903 and the fixing portion is sealed with an O ring 904. An air chamber 905 is provided within the housing 903 and a spring 906 urges a diaphragm 907. The other end of the housing 903 is fixedly coupled with an insulating plate 908 by means of a screw. A point A 910 is provided at a location in opposition to a point B 909 provided at the center of the diaphragm 907. Two boost pressure switches with such a construction are used; one is set to operate at −100 mmHg and the other at −380 mmHg. Both switches are constructed so as to adapt for the circuit shown in FIG. 12. The outputs $P_{OUTD}$ and $P_{OUTH}$ are connected to the reset terminals of the counters 504a and 504b in the time limit circuit 504 of the negative pressure sensing unit 500. With such a connection, the similar control to that of the above-mentioned embodiment may be secured. At this time, the intake negative pressure is led to an air chamber 905, through the pipe 901 with an adjust screw. At this time, a difference pressure between the negative pressure and the air pressure pushes the diaphragm 907 to the right. However, since the spring 906 pushes it to the left, when the negative pressure is low, a space between the point A and B is closed. When the negative pressure is high, the force to push the diaphragm 907 to the right overcomes the spring force of the spring 906 to open the space between the points. Since the force of the spring 906 is adjusted by the pipe 901 with an adjust screw, if it is adjusted to −100 mmHg and −380 mmHg, the output $P_{OUTL}$ of the circuit shown in FIG. 12 is a "0" level for −100 mmHg and the output $P_{OUTH}$ is a "0" level for −380 mmHg.

Figure 13:
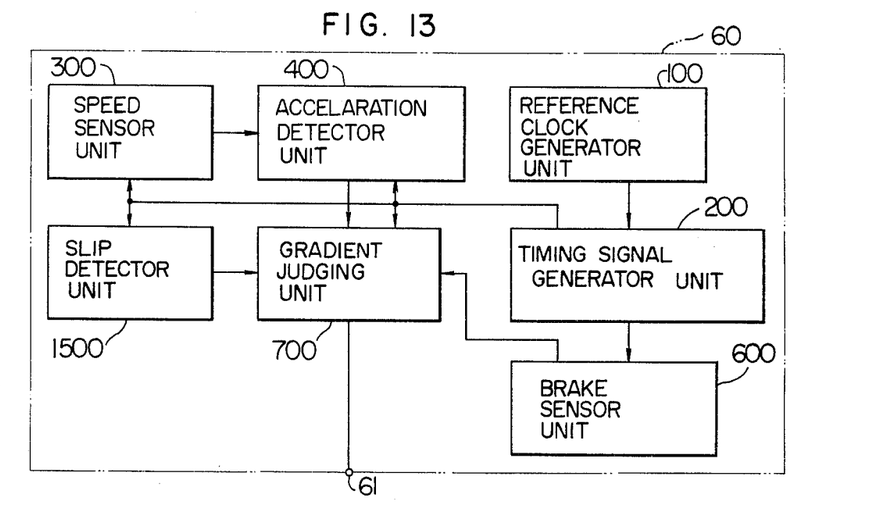
FIG. 13 shows a block diagram of a third embodiment of a gradient detector unit used in the circuit shown in FIG. 1.

A third embodiment of a slope sensor 60 according to the present invention will be described referring to a block diagram shown in FIG. 13. In the figure, reference numeral 100 designates a reference clock generator unit for generating clock pulses with a fixed frequency by using a CR oscillator; 200 a timing signal generator unit for operating the respective portions in the circuit at a proper sequence; 300 a vehicle speed sensor unit; 400 an acceleration detector unit which receives the output signal from the vehicle speed sensor unit to detect an acceleration/deceleration of the vehicle; 1500 a slip detector unit for detecting a slippage of the torque converter on the basis of a ratio of the engine speed and the number of rotation of the propeller shaft; 600 a brake sensor unit for sensing ON of the brake switch; 700 a gradient judging unit for judging a gradient of the road on the basis of the signals from the acceleration sensor unit 400 and the slip detector unit 1500.

The operation of a gradient sensing with the above-mentioned construction will be described.

Description will proceed with the following conditions in the descending road drive;

(1) In the overdrive mode, the car is in a power OFF state (engine braking is effective) and in an acceleration state. On the level paveway, there never occurs the situation (1) if the engine braking is effective. On the descending road, the situation (1) occurs since the potential energy is converted into the kinetic energy. Let us consider the meaning of "engine braking". In a state having no torque converter, the engine speed N (Hz) is expressed $$N = \beta \cdot M, \qquad (2)$$

where M (Hz) is the number of rotations of the propeller shaft and $\beta$ is a constant determined by a gear ratio of the transmission in the overdrive mode. A state where the "engine braking" is effective may be considered as $$N < \beta \cdot M \qquad (3)$$

In the case of an automobile (EFI car) with the electronic controlled fuel injection device, the following relation holds between the engine speed N and the fuel injection signal Q(Hz)

$$N = \gamma \cdot Q \qquad (4)$$

Further, the number of rotations of the propeller and an output frequency (Hz) of a car speed sensor to be described later are related by $$M = \xi \cdot W, \quad (5)$$

where $\gamma$ and $\xi$ are constants dependent on the construction of the EFI, the engine transmission and the like, and the car speed sensor. Substituting the equations (4) and (5) into the relation (3), we have $$Q < (\beta \cdot \xi / \gamma) W \quad (a)$$

The situation (1) may be expressed, on the descending road, by using the relation (a) as below, $$Q < (\beta \cdot \xi / \gamma) W \text{ and acceleration.} \quad (b)$$

On the ascending road, the reversed situation takes place, (6) The overdrive mode and power ON, and deceleration. A relationship between the fuel injection signal Q and the car speed sensor output W is $$Q > (\beta \cdot \xi / \gamma) W, \quad (7)$$

and this corresponds to the reversed condition in the descending road. Also in the case of the normal drive on the level road, the relation (7) holds. Therefore, this condition is an insufficient judging condition. For this reason, the following condition is used for the ascending road drive.

(8) An integrated value (fuel consumption) of the pulse width of the fuel injection signal Q(t) for a given running distance, exceeds a given value (S), and deceleration. This condition (8) may mathematically be expressed by $$S \leq \int_T^{T+A/W} Q(t) \cdot dt, \text{ and acceleration,} \quad (c)$$

where the pulse produced from the car speed sensor for the predetermined running distance is A. In this way, the descending or ascending road are judged. Let us then consider the condition of the drive mode return. Assuming that the constant determined by the gear ratio of the transmission at the third gear is $\alpha$, a state that the torque converter has some slip in the level road drive is given $$Q > (\alpha \cdot \tau / \gamma) W \quad (9)$$

The relation (9) also holds on the ascending road and can not prevent the hunting on the ascending road. Therefore, even if the overdrive is released to be geared down to the third gear range, the return to the overdrive must be blocked when the load is heavy. To this end, the following relation may be used $$S > \int_T^{T+A/W} Q(t) \cdot dt \quad (10)$$

The relation (10) holds even at the third gear when the load is light (that is, in the level road drive). In the deceleration mode, since there is no need for returning to the overdrive gear, the returning condition, in addition to the condition (9) and (10), is $$Q > (\alpha \cdot \xi / \gamma) W \text{ and } S > \int_T^{T+A/W} Q(t) \cdot dt \quad (11)$$

and not decelerated.

Additionally, the following conditions, as shown in a judging table II, are set up in the present embodiment:

The speed condition for release is 30 Km/h; the speed condition for return is 50 Km/h; A continuous a reliable operation; When the brake is applied the descending road, it may quickly be released even if the continuous condition is not satisfied.

When there is no slip in the torque converter, in $Q = (\beta \cdot \xi / \gamma) W$, the overdrive mode has $\beta = 0.688$, $\gamma = 1$, and $\xi = 18/15 \times 4$, and in $Q = (\alpha \cdot \xi / \gamma)$ the third gear running has $\alpha = 1$.

JUDGING TABLE II

| | ON condition | | | |
|---|---|---|---|---|
| | Descending road | Ascending road | Descending brake | OFF condition |
| Vehicle speed (Km/h) | 30 or More | 30 or More | 30 or More | 50 or More |
| Acceleration (G) | +0.02 or More | −0.02 or Less | +0.02 or More | −0.02 or More |
| Torque converter slip (W = 32) | Q<20 | — | Q<20 | Q≧29 |
| Injection signal integration (m sec) (during W = 32) | — | 115 or More | — | 115 Less than |
| Continuous period (two sec./once) | two times | two times | one time | two times |
| Brake | — | — | ON | — |

Figure 14:
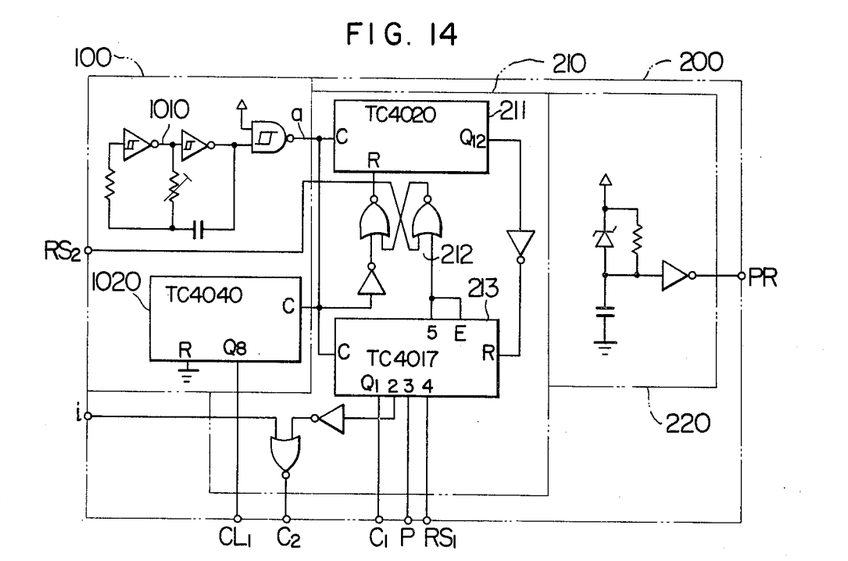
FIG. 14 shows a circuit diagram of a reference clock generator section and a timing signal generator unit used in the circuit shown in FIG. 13.

The respective portions in the circuit shown in FIG. 13 will be described referring to FIGS. 14 to 17. FIG. 14 shows a circuit diagram of the reference clock generator unit 100 and the timing signal generator unit 200. The reference clock generator unit 100 is comprised of a CR oscillator 101 and a frequency dividing counter 102. The output a of the oscillator 101 becomes a signal of 2048 Hz and the output signal CL1 of the frequency counter 102 becomes a signal of 8 Hz. The timing signal generator unit 200 is comprised of a timing signal circuit 210 and a power reset circuit 220. The combination of a counter 211, a flip-flop 212, a counter 213 and the like produces short pulses at the respective terminals C1, C2, P, RS1, and RS2 every 2 sec (2048/4096). At this time, the power reset circuit 220 produces short pulses at the terminals P and R when the power is turned on.

Figure 15:
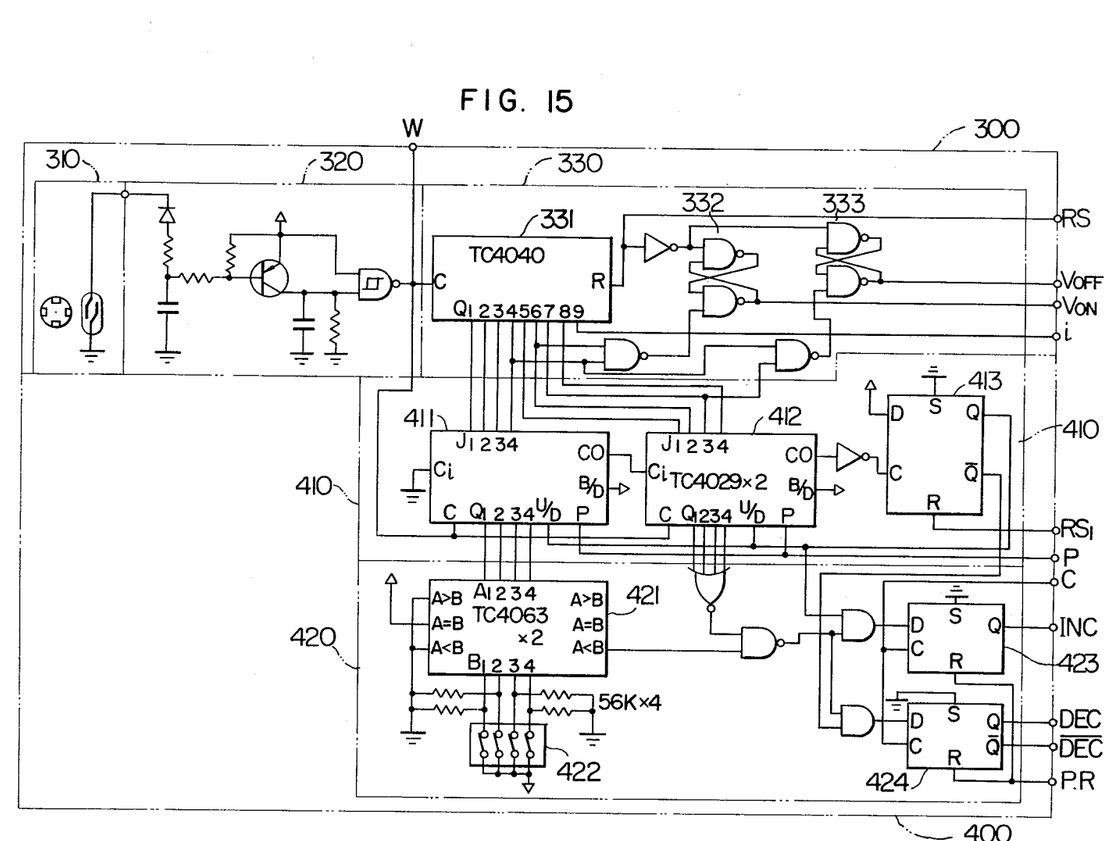
FIG. 15 shows a circuit diagram of a vehicle speed detector and an acceleration detector used in the circuit shown in FIG. 13.

FIG. 15 shows a circuit diagram of the vehicle speed sensor unit 300 and the acceleration sensor unit 400. The speed sensor unit 300 is comprised of a vehicle sensor 310 for producing four pulses per one rotation of the speed meter cable shaft, a waveshaping circuit 320, and a vehicle sensor circuit 330. The pulse generated by the vehicle sensor 310 is waveshaped by the waveshaping circuit 320 and then is applied to the speed sensor circuit 330. The speed sensing circuit 330 is comprised of a binary counter 331, and two RS flip-flops 332 and 333. Between the pulses RS2 with a 2 sec interval produced from the timing signal generator unit 200, the binary counter 331 counts the speed pulses. And it produces a "1" level signal at the output terminal $V_{ON}$ when the speed is about 30 Km/h or more, and produces a "1" level signal at the output $V_{OFF}$ when the speed is above 50 Km/h. When the vehicle speed is above approximately 180 Km/h, a "1" level signal appears at the i terminal when the speed is above approximately 180 Km/h. An acceleration detector 400 is comprised of a pseudo differential circuit 410 and an acceleration setting circuit 420. The pseudo differential circuit 410 is comprised of presettable up/down counter 411 and 412 and a D flip-flop 413. In response to the present signal of the timing signal generator unit 200, the contents of the binary counter 331 of the vehicle speed sensor unit 300 is preset in the presettable up/down counters 411 and 412 which counts down the preset value by the vehicle speed pulse for the next vehicle measuring period 2 sec of the vehicle speed succeeding to that just preset. When the preset vehicle speed is larger than the preceeding one, that is, in the acceleration mode, the present vehicle speed pulse is larger than the preset one. Under this condition, the presettable counters 411 and 412 are emptied. At this time, the D flip-flop 413 is triggered to set the counters 411 and 412 to the up-count mode. Then, those counters count up a difference between the vehicle speeds. On the other hand, when the present speed is smaller than the preset one, the D flip-flop 413 is not triggered and a difference between the vehicle speed pulses is left in the counters. By repeating the above operation every two seconds, the speed difference, i.e. pseudo speed differential value (acceleration), appears every two seconds at the outputs Q1 to Q4 of the counters 411 and 412, and the positive and negative acceleration appear at the output Q and $\bar{Q}$ of the D flip-flop. A magnitude of the acceleration is 0.01 G $(1/(2^2 \times 9.8 \times 2.548) \approx 0.01)$ per bit in the presettable up/down counter 411. Accordingly, if a proper value n is set by the switch 422 of the acceleration setting circuit 420, the output INC and DEC of the D flip-flops 423 and 424 coupled with the digital comparator 421 provide "1" level signals when the acceleration/deceleration exceeds 0.01 G×n.

Figure 16:
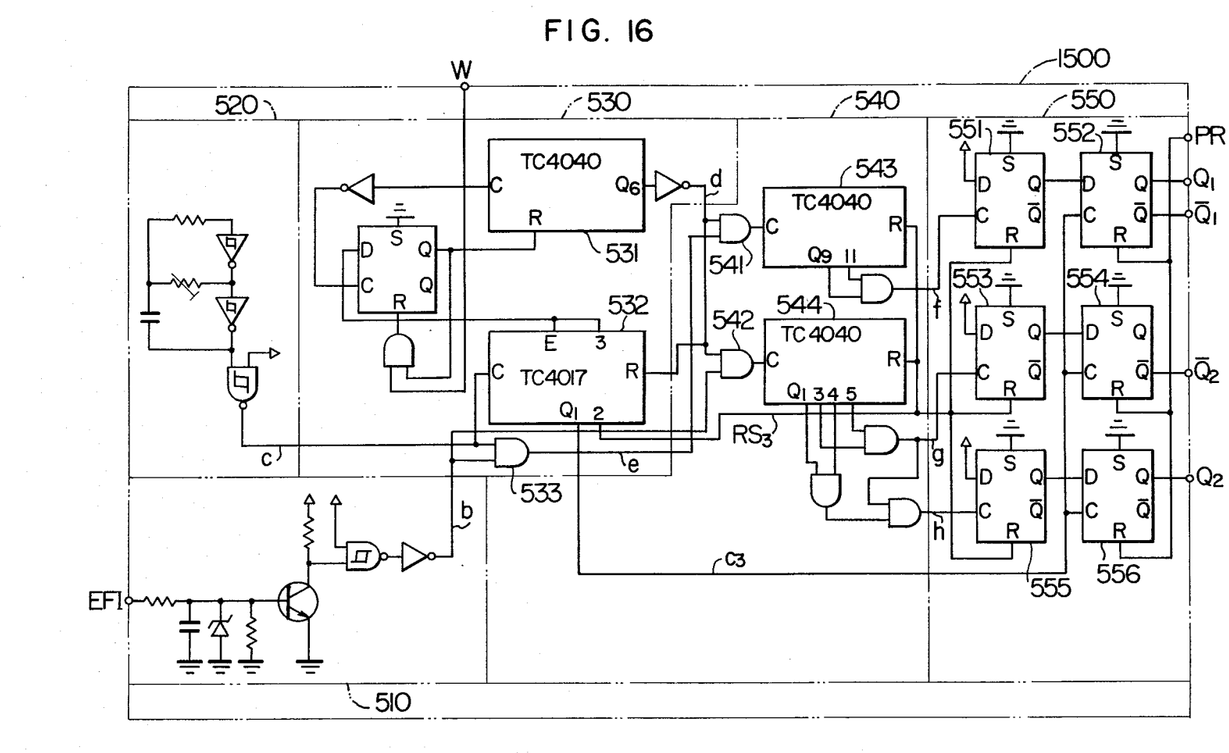
FIG. 16 shows a circuit diagram of a slip detector unit shown in FIG. 13.

FIG. 16 shows a circuit diagram of the slip detector unit 1500. The slip detector unit 1500 is comprised of an injection signal input circuit 510, a CR oscillator 520, a control circuit 530, a counter circuit 540 and a latch circuit 550. An injection signal is waveshaped in the injection signal input circuit 510 and is outputted on a line b. The signal on the line b becomes a gate signal of an AND gate 533 to allow the passage of an output signal c of the 10 KHz from the oscillator through the AND gate 533. Upon receipt of the vehicle speed signal W from the vehicle speed sensor 300, the control circuit 530 produces signals C3 and RS3 at a 32-pulse period and a gate signal d for 32 pulses. In the counter circuit 540, the signals b and e are gated by the signal d and then are counted in the counters 543 and 544, respectively. In the counter 543, in the ascending road condition (c), S=115 m sec and $S \leq T^T + A/WQ(t) \cdot dt$ holds and under this condition the signal f becomes a "1" level, to trigger the D flip-flop 551 of the latch circuit 550. In the descending road condition, when W=32, $Q=(\beta \cdot \xi/\gamma) \cdot W=20$, the signals g and f are a "1" level, when the count of the counter 544 is 20 or more. In the return condition (11), when W=32, $Q=(\alpha \cdot \xi/\gamma) \cdot W=29$. Accordingly, under this condition, when the count is 29 or more, the signals g and h are a "1" level. Then, the D flip-flops 553 and 554 of the latch circuit 550. The contents are latched in the D flip-flops 552, 554, and 555 at the timing of the signal C3.

Figure 17:
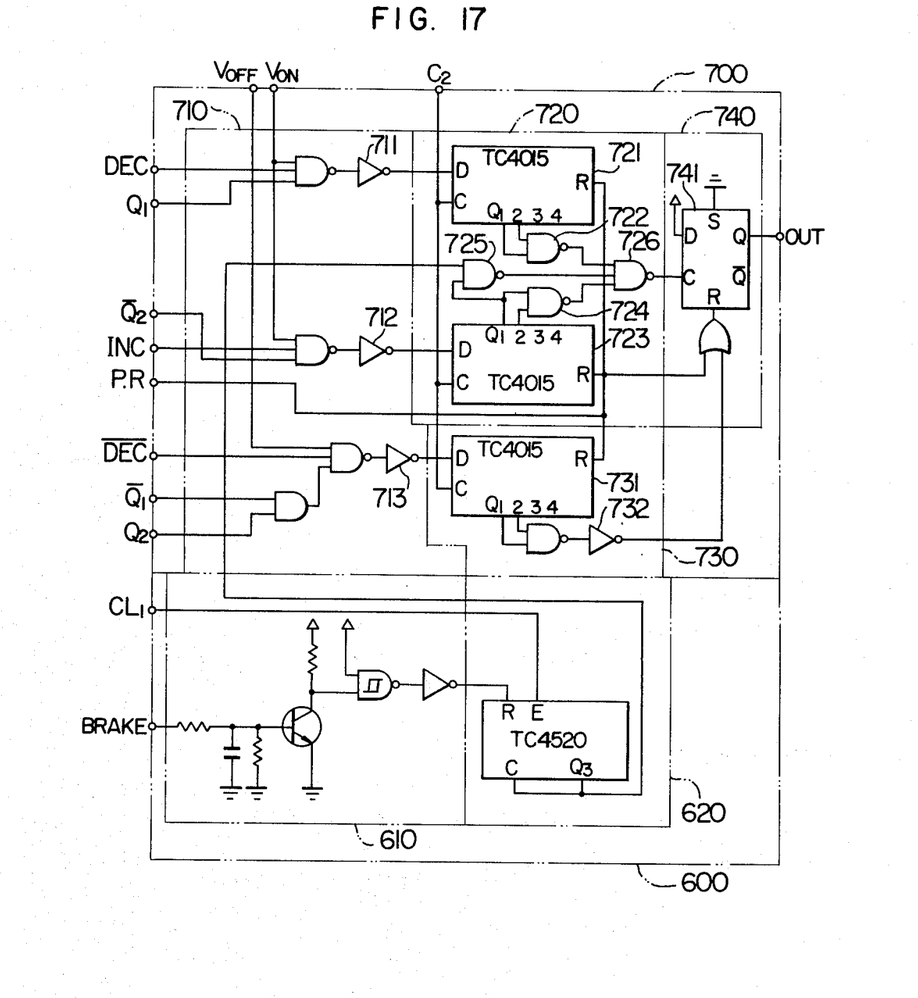
FIG. 17 shows a gradient judging unit and a brake detector unit shown in FIG. 13.

FIG. 17 is a circuit diagram including the gradient judging unit 700 and the brake sensor unit 600. The brake sensor unit 600, comprised of a waveshaping circuit 610 and a time limit circuit 620, receives an ON signal from the brake switch to provide a "1" level signal at the terminal $B_R$ when the brake is turned on for a given time limit (1 sec) or more. The slope judging circuit 700 includes an AND circuit 710, an ON circuit 720, an OFF circuit 730, and an output circuit 740. In the AND circuit 710, when the logical product of ($V_{ON}$ ⊕ DEC ⊕ Q1) holds, the output of the inverter 711 is in "1" level. When the logical product of ($V_{ON}$ ⊕ INC ⊕ Q2) holds, the output of the inverter 712 is a "1" level. When the logical product of ($V_{OFF}$ ⊕ $\overline{DEC}$ ⊕ $\overline{Q1}$ ⊕ Q2) holds, the output of the inverter 713 is a "1" level. The validity of the ($V_{ON}$ ⊕ DEC ⊕ Q1) indicates the ascending road drive. The validity of the ($V_{ON}$ ⊕ INC ⊕ $\overline{Q2}$) indicates the descending road drive. The validity of the ($V_{OFF}$+$\overline{DEC}$ ⊕ $\overline{Q1}$ ⊕ Q2) indicates the level road drive. Accordingly, in the ON circuit 720, when the "1" level signal of the inverter 711 continues for two periods (2 sec×2) of the signal CL2, the shift register 721 renders the output of the NAND gate 722 "0" state and the output of the NAND gate 726 "1". Similarly, when the "1" level signal of the inverter 712 continues for two periods or more of the signal CL2, the shift register 723 renders the output of the NAND gate 724 "0" state and the output of the NAND gate 726 "1" state. Even the "1" level of the inverter 712 does not continue for two periods of the signal CL2, the output from the NAND gate 726 becomes a "1" level, through the NAND gate 725 if the brake is turned on. In the OFF circuit 730, the "1" level signal of the inverter 713 continues for two periods or more of the signal CL2, the shift register 731 renders the output from the inverter 732 "1" level. Accordingly, in the output circuit 740, the "1" level signal from the NAND gate 726 in the ON circuit 720 triggers the D flip-flop and is reset by the "1" level signal of the inverter 732 of the OFF circuit 730 and has "0" level at the output terminal Q.

Thus, when the ON condition in the judging table II is satisfied, the OUT terminal of the output circuit 740 becomes a "1" level, while when the OFF condition holds, it is a "0" level.

What is claimed is:

1. An overdrive control apparatus for automotive vehicles for controlling a transmission having a plurality of transmission ranges and an overdrive range, which is sequentially and automatically changed in response to the output signals of a vehicle speed sensor and an engine load sensor comprising:

gradient sensor means for detecting the gradient of a running road of the vehicle to provide a signal indicative of whether the road has an ascending gradient of more than a first predetermined value or a descending gradient of less than a second predetermined value; and release means responsive to the gradient signal of said gradient sensor means and irrespective of the output signals of said vehicle speed sensor and said engine load sensor for forcibly releasing the transmission from the overdrive range to said plurality of transmission ranges only when the transmission is positioned at the overdrive range.

2. An overdrive control apparatus according to claim 1 wherein said gradient sensor means includes a distance sensor detecting the running distance of the vehicle, a pressure sensor detecting an air pressure surrounding said pressure sensor, operational means responsive to the output signals of said distance sensor and said pressure sensor for calculating the gradient of the running road, and gradient decision means responsive to the output signal of said operational means for deciding whether the gradient value proportional to the output signal of said operational means becomes higher than said first predetermined value or lower than said second predetermined value.

3. An overdrive control apparatus according to claim 1 wherein said gradient sensor means includes an acceleration detector detecting the acceleration of the running vehicle, a negative pressure detector detecting an intake negative pressure of the vehicle engine, and a gradient decision circuit for receiving the output signals of said acceleration detector and said negative pressure detector to decide whether the gradient of the running road becomes higher than said first predetermined value or lower than said second predetermined value.

4. An overdrive control apparatus according to claim 1 wherein said gradient sensor means includes an acceleration detector detecting the acceleration of the running vehicle, a slip detector detecting a slipping state of a torque converter of said transmission, and a gradient decision circuit responsive to the output signals of said slip detector and said acceleration detector for deciding whether the gradient of the running road is higher than said first predetermined value or lower than said second predetermined value.

5. An overdrive control apparatus according to claim 1 or 2 which further comprises timer means for maintaining the release of the transmission from the overdrive range obtained by the output signal of said gradient sensor means during a predetermined time interval irrespectively of the change of a succeeding output of said gradient sensor means.

6. An overdrive control apparatus according to claim 3 or 4 wherein said acceleration detector includes a distance sensor producing a distance signal at every time when the vehicle travels a predetermined distance.

7. An overdrive control apparatus according to claim 4 wherein said slip detector produces a slip signal obtained by detecting the ratio of an input rotational speed and an output rational speed of the torque converter.

* * * * *